(12) United States Patent  (10) Patent No.: US 7,854,175 B2
Weilguny et al.  (45) Date of Patent: Dec. 21, 2010

(54) APPARATUS FOR MEASURING THE VELOCITY OF A FLUID FLOW

(75) Inventors: Güenter Weilguny, Altheim (AT); Wasner Wolfgang, Ried im Innkreis (AT); Michael Naderhirn, Linz (AT)

(73) Assignee: Gunytronic Gas Flow Sensoric Systems GmbH, Weng IM Innkreis (AT)

( * ) Notice: Subject to any disclaimer, the term of this patent is extended or adjusted under 35 U.S.C. 154(b) by 120 days.

(21) Appl. No.: 12/224,145

(22) PCT Filed: Feb. 19, 2007

(86) PCT No.: PCT/AT2007/000088
§ 371 (c)(1),
(2), (4) Date: Aug. 19, 2008

(87) PCT Pub. No.: WO2007/095654
PCT Pub. Date: Aug. 30, 2007

(65) Prior Publication Data
US 2009/0044634 A1 Feb. 19, 2009

(30) Foreign Application Priority Data
Feb. 20, 2006 (AT) .............................. A 263/2006

(51) Int. Cl.
G01F 1/56 (2006.01)
(52) U.S. Cl. .................................................. 73/861.09
(58) Field of Classification Search ............. 73/861.09, 73/861.08, 861.06, 194
See application file for complete search history.

(56) References Cited
U.S. PATENT DOCUMENTS 2,619,836 A 12/1952 Downing
3,242,729 A 3/1966 Keller
3,945,251 A * 3/1976 Pierce ..................... 73/861.09
4,056,003 A 11/1977 Zizine (Continued)

FOREIGN PATENT DOCUMENTS

DE 2819506 11/1978

(Continued)

OTHER PUBLICATIONS

Malaczynski, G.W., et al., "An Ion-Drag Air Mass-Flow Sensor for Automotive Applications" IEEE Transactions on Industry Applications, IEEE Service Center, vol. 28, No. 2, Mar. 1992, pp. 304-309, XP000291654.

*Primary Examiner*—Jewel Thompson
(74) *Attorney, Agent, or Firm*—Muirhead and Saturnelli, LLC

(57) ABSTRACT

An apparatus for measuring the velocity of a fluid flow provides electrical charge carriers that are emitted into the fluid flow from an emitter electrode, and wherein an electrical signal caused by this is measured at a sensor electrode. The projection of the envelope of the cross-sectional area of that part of the sensor electrode which projects into the fluid flow into the cross-sectional plane of the fluid flow is small in comparison with the cross-sectional area of the fluid flow at this point, if present at all. The measured current of the sensor electrode is used to serve as a characterizing feature of the velocity of the fluid flow in accordance with a defined allocation function. The measurement method has virtually no delay and can be used in a high temperature and velocity range.

22 Claims, 7 Drawing Sheets

U.S. PATENT DOCUMENTS

| | | | | |
|---|---|---|---|---|
| 4,121,456 A | * | 10/1978 | Depoitier et al. | 73/861.09 |
| 4,136,564 A | | 1/1979 | Suzuki et al. | |
| 4,152,935 A | | 5/1979 | Nagaishi et al. | |
| 4,163,389 A | * | 8/1979 | Suzuki | 73/861.09 |
| 4,167,114 A | | 9/1979 | Zizine | |
| 4,186,601 A | | 2/1980 | Maruoka | |
| 4,272,995 A | * | 6/1981 | Weistra | 73/861.09 |
| 4,305,301 A | * | 12/1981 | Evans et al. | 73/861.09 |
| 4,387,602 A | * | 6/1983 | Lao | 73/861.09 |
| 4,393,719 A | * | 7/1983 | Wiegand et al. | 73/861.05 |
| 4,409,822 A | * | 10/1983 | Bariol et al. | 73/114.67 |
| 4,441,371 A | * | 4/1984 | Cockshott et al. | 73/861.09 |
| 4,448,082 A | * | 5/1984 | Barriol et al. | 73/861.05 |
| 4,480,484 A | | 11/1984 | Ueyama | |
| 4,953,407 A | | 9/1990 | Malaczynski et al. | |
| 5,247,836 A | * | 9/1993 | Lew et al. | 73/861.08 |
| 7,523,673 B1 | * | 4/2009 | Chorpening et al. | 73/861.09 |

FOREIGN PATENT DOCUMENTS

| | | |
|---|---|---|
| DE | 19633680 | 4/1997 |
| SU | 1553831 A1 | 3/1990 |

* cited by examiner

APPARATUS FOR MEASURING THE VELOCITY OF A FLUID FLOW

TECHNICAL FIELD

This application relates to an apparatus for measuring fluid flows. It can be used in a particularly advantageous manner for measuring gas flows.

BACKGROUND OF THE INVENTION

U.S. Pat. No. 4,152,935 (Nissan) describes a device for measuring the mass flow of a fluid through a pipe made of an electrically non-conducting material. An ionized electrical field is introduced into the fluid with the help of a pair of electrodes. The first electrode of this pair is a peak projecting into the center of the fluid flow. High voltage impulses are applied to it. The second electrode of this pair is grounded. With reference to the fluid flow, it is located so as to be flush on the defining wall of the fluid flow on the same height as the first electrode, but at a distance to said first electrode. The fluid flow is comprised slightly downstream by means of a third electrode, which is also grounded. A grid electrode furthermore extends across the cross section of the fluid flow yet slightly further downstream. The time that passes until the ion cloud caused on the ionizing electrode by means of a high voltage impulse drifts through the fluid flow up to the grid electrode and causes a potential change against ground at that location is measured. The grounded electrode fixed between high voltage electrode and grid electrode, which comprises the fluid flow, serves the purpose of avoiding interfering undesired charges and discharges. Important disadvantages of this design are the requirement of an electrically insulating and thus non-metallic pipe, the fact that the measuring time becomes very long in response to slow flows, the fact that oppositely oriented flows can be measured only by an approximated duplication of the already considerable cost input, the fact that pulsating flows at which the amplitude of the motion is smaller than the measuring length cannot be measured at all and the fact that statements relating to the turbulence of the flow cannot be made.

U.S. Pat. No. 4,953,407 (General Motors) proposes an apparatus for measuring the gas flow in the common air supply pipe for an internal combustion engine, which is also based on the principle of the ion transport. To avoid interfering influences caused by the accumulation of polar molecules ($H_2O$) on ions, the surrounding electrical field is kept so low that the thermal separation efficiency again compensates for the accumulation. Two configurations designed mirror-symmetrically with reference to a cross sectional plane of the fluid flow consisting of an acute high voltage electrode, which causes a corona, partial cylinder sleeve-shaped counter electrode and grid-shaped sensor electrode are proposed, a difference signal of which is detected. It is thus also possible to measure in both flow directions. For using the apparatus for measuring the air supplied to the internal combustion engines, it is disadvantageous that an electrically non-conducting pipe is necessary, that the apparatus is relatively long, that it cannot measure fast enough to correctly detect flows, which chronologically change rapidly and that it comes into saturation in response to high flow velocities and thus only supplies highly inaccurate values.

The publication "An ion-drag air mass-flow sensor for automotive applications" by Gerhard W. Malaczynski and Thaddeus Schroeder for the IEEE Conference 1989 points out that it would be highly advantageous to measure the air drawn in internal combustion engines in a cylinder-selective manner, but that this has the problem that the flow velocity in the individual suction pipes for currently known flow measuring devices would be too high. The object would be manageable with a configuration according to afore-described U.S. Pat. No. 4,953,407, if the distance between source electrode and collector electrode is chosen to be sufficiently large in adaptation to the maximal velocity to be measured. The disadvantage of this proposal is that it is oftentimes difficult to accommodate the required pipe lengths, that turbulences of the flow cannot be detected and mainly that the measuring sensitivity in response to low velocities becomes too low in response to the highest occurring velocities.

U.S. Pat. No. 3,242,729 describes the velocity measurement in a duct through which an electrolytic fluid flows. Three electrodes project into the duct at a distance behind one another. A current flow is established between the first two electrodes by means of a low voltage. The voltage is measured between the last electrode and the central electrode at a high measuring resistance. Said voltage provides information relating to the velocity of the fluid. The flow guiding mechanisms in an electrolyte are very different from those in an inherently non-conducting fluid, such as gas flows are in a normal case.

U.S. Pat. Nos. 4,056,003 and 4,167,114 show configurations where at least three grid electrodes, which preferably cover the entire flow cross section, are arranged in flow direction behind one another in a duct at a distance to one another. By means of voltage as compared to the second electrode and supported by radioactivity, a corona discharge is maintained on the first electrode. The electric charge arriving at the third electrode is measured. In addition to the disadvantage of radioactivity, the same disadvantages arise as already described above with reference to U.S. Pat. No. 4,152,935.

A similar principle, which also leads to the same disadvantages is also proposed in U.S. Pat. No. 4,136,564. A charge quantity introduced by means of high voltage is controlled to a constant variable per time. A grid electrode, which extends across the entire duct cross section, is fixed downstream. The charge quantity arriving at that location is measured; it provides information relating to the velocity of the fluid. The voltage required for continuously controlling the introduced charge provides additional information relating to the density of the fluid.

According to U.S. Pat. No. 4,163,389, charge carriers are introduced into the fluid at a first electrode pair by means of a corona discharge. An electric current is guided via the fluid duct via an electrode pair arranged downstream therefrom by means of applying a direct current. A conclusion relating to the flow velocity of the fluid is drawn from the chronological phase shift between a pulsing of the corona discharge and a pulsing of the current caused thereby at the electrode pair connected downstream. The disadvantages in turn are substantially the same as in the afore-mentioned U.S. Pat. No. 4,152,935.

U.S. Pat. No. 4,186,601 also proposes a similar functional principle, which in turn leads to the same disadvantages. Charge carriers are introduced into the fluid at a first electrode pair by means of a corona discharge. Either the voltage at this first electrode pair or at an electrode projecting into the flow downstream is triggered. The chronological course of the arriving signal is measured at an electrode, which is arranged even further downstream. The chronological shift between a shoulder of the trigger signal and a shoulder of the signal course caused thereby are used for drawing a conclusion relating to the velocity of the fluid.

There is an abundance of publications relating to how to measure the air drawn in internal combustion engines by means of hot-wire sensors. According to the underlying measuring principle, a wire around which the fluid flow to be measured flows, the electrical resistance of which is highly dependent on the temperature, is heated beyond the temperature of the gas flow. The cooling by means of the fluid flowing around is a measure for density and velocity of the fluid. Considerable disadvantages of this quite common method are that the same measuring result is generated in response to a negative flow velocity as in response to a positive flow direction, that the measuring time is too slow for rapid controls, that the temperature range in which the sensor can be used is relatively limited and that the sensitivity against destruction caused by the solid particles floating along in the flow is relatively high and that the sensitivity against impacts caused by moisture is also considerable. Such sensors are thus always used only for accumulation intake pipes of internal combustion engines and never for the discharge pipes, which lead to the individual cylinders. There is an abundance of tricky proposals relating to how to correct the falsification of the measuring result by means of fluid flows temporarily flowing back, for example by means of local flow smoothing or by processing additional information relating to the respective operating state of the engine by means of interpolation. DE 196 33 680 B4 is mentioned as an example.

Accordingly, it would be desirable to provide a sensor for the velocity measurement of fluid flows, which is faster and more robust as compared to known sensors and which encompasses a larger temperature application. The sensor may also correctly detect a reversal of the direction of the fluid flow.

SUMMARY OF THE INVENTION

According to the system described herein, an emitter electrode provided with a sufficiently high negative or positive voltage projects into or to the fluid flow, respectively, and continuously emits electric charge carriers from its surface into the fluid flow. The required counter electrode, which is arranged so as to be electrically insulated from this emitter electrode, can be the electrically conducting wall of the fluid duct or another electrode arranged in the fluid duct, preferably on its wall, or an electrode arranged outside of the fluid duct, the electrode being preferably embodied as grounding. At least one sensor electrode is fixed to a location preferably located downstream on the fluid flow. The projection of the enveloping surface of said sensor electrode, which is projected into the adjacent cross sectional plane of the fluid flow, is small as compared to the cross sectional area of the fluid flow at that location. The electric current arriving at the sensor electrode is measured. It is a small fraction of the current, which is fed by the emitting electrode. Surprisingly, the portion (fraction) of the current through the sensor electrode relative to the emitted current follows a reproducible, monotonously increasing and approximately linear function of the velocity of the fluid.

Conclusions relating to the fluid velocity can thus be made by means of measuring the current through the sensor electrode and a conclusion relating to the mass flow of the fluid flowing through a cross sectional area per time can be made by additionally considering the parameters pressure, temperature, moisture, gas composition and cross sectional area of the fluid flow.

However, if one assumes constant environment conditions for certain measuring requirements, individual parameters need not be considered to be able to draw a conclusion relating to the mass flow via the sensor current. This can go so far that other measuring parameters need not be considered at all to be able to determine the mass flow of the fluid, e.g., at constant temperatures, pressures, moisture conditions, gas compositions, etc.

If in the region of the fluid flow to be measured, measurements are made on at least two sensor electrodes, which have different measuring characteristic curves in relation to fluid velocity, and if a plurality of measuring characteristic curves is attained for each sensor electrode for different values of parameters of the fluid, such as, e.g., density, moisture, particle content, etc., a self-calibration of the measuring arrangement with respect to the fluid velocity measurement can be carried out during operation with automated data processing means. Those points of states, where the same fluid parameters apply for all of the measuring points—and a ratio to one another known for the respective arrangement—and where the respective measuring values at the sensor electrodes mean the same velocity—and the ratio known for the respective configuration, are selected from the stored plurality of characteristic curves. The different measuring characteristic curves can be attained by means of the different designs and/or arrangements of sensor electrodes (type, design, dimension, distance, position, material, insulation body etc.).

BRIEF DESCRIPTION OF THE DRAWINGS

Embodiments of the system described herein are illustrated by means of the drawings, which are briefly described as follows.

DETAILED DESCRIPTION OF VARIOUS EMBODIMENTS

For reasons of comprehensibility, the cross sectional area of a wall defining a fluid flow is identified as "duct wall". It is clarified herewith that this term also applies in the case of such fluid flows, which are not defined by a wall around the entire cross sectional area, which applies, for example, to the fluid flow, which flows at wing of an airplane relative thereto.

Figure 1:
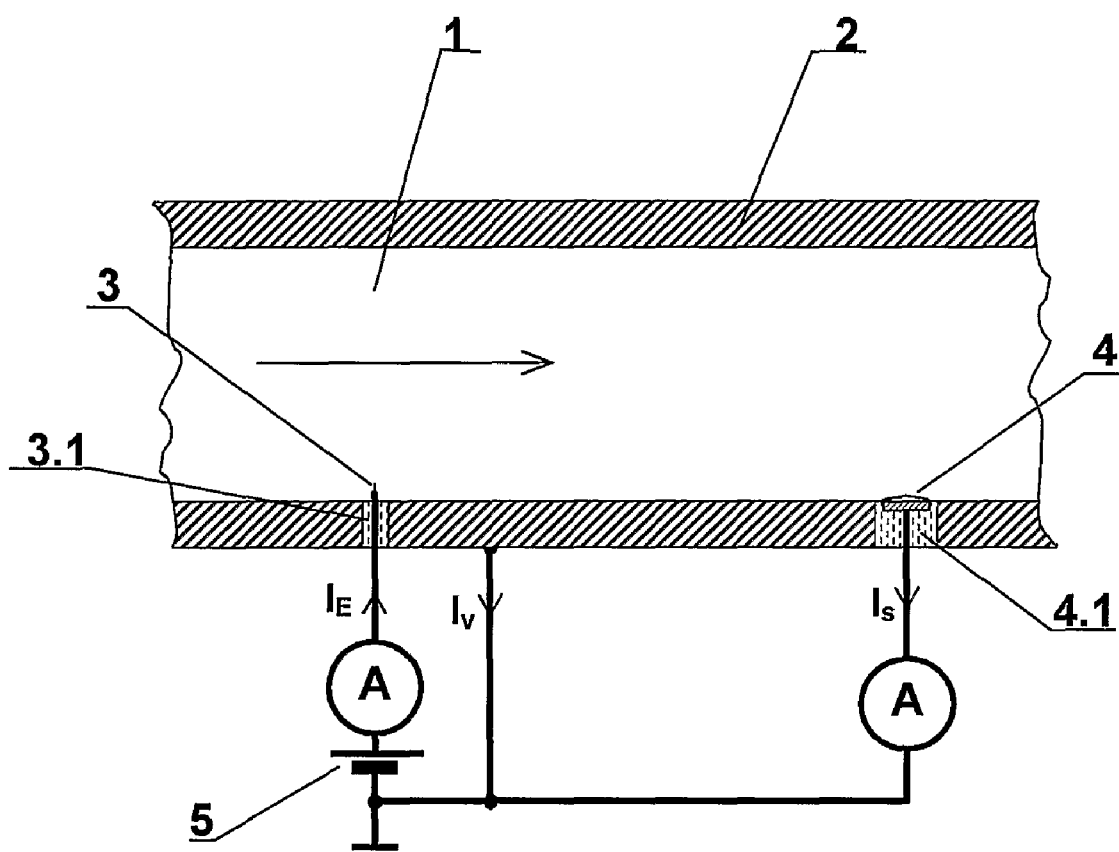
FIG. 1 shows the basic measuring setup. The direction of the electric currents drawn in is the technical flow direction.

In the example illustrated in FIG. 1, the duct wall 2 comprises an electrically conducting material, which preferably also serves here as a grounded counter electrode and, respectively, ground electrode for the emitter electrode 3. However, it could also be made of an electrically insulating material. It would then be necessary to fix a grounded counter electrode for the emitting electrode 3 in the interior or in the close outer region around the duct.

The sensor electrode 4 barely projects into the cross sectional area of the duct, in which the fluid 1 flows, but only abuts on the inside of the duct wall 2 on the fluid 1 so as to be flush. In its total area, the sensor electrode 4 is also relatively small. The sensor electrode 4 is arranged isolated from the conducting duct wall 2 by means of an insulating body 4.1, that is embodied as a feedthrough.

The sensor electrode does not necessarily need to abut against the duct wall. With an enclosed duct cross section, it can also project into the center of the cross sectional area; with an open duct cross section, it can also protrude considerably from the duct wall.

The emitting electrode 3 can also be embodied so as to be simple and small, for example as a needle. It carries high voltages during the normal state of operation. It is thus separated from the duct wall 2 by means of a corresponding break-down resistant, insulating body 3.1. It is highly advantageous to embody the emitting electrode 3 at its part, that comes into contact with the fluid 1, with a peak or an edge, which are as acute-angled as possible so that, as compared to a flatter embodiment, the high field strength required for the emission of electrons can be attained somewhat easily. When the peak of the emitting electrode protrudes not far from the conducting duct wall, but is closer to it, the insulating ring between this peak and the duct wall is to be chosen to be correspondingly wide, typically several mm, so that a flashover between emitting electrode and duct wall does not occur. Like the sensor electrode, the emitter electrode may also project into the center of the cross sectional area with an enclosed duct cross section; with an open duct cross section, it may protrude considerably from the duct wall.

In particular for the use of the measuring configuration for determining the amount of air supplied to an combustion engine, it is advantageous to connect the emitting electrode 3 to the negative pole of the high voltage source 5 and not to the positive pole. That is to say, that the measuring result thus represents to an increased extent the amount of air ingested, which is crucial for the combustion.

Figure 2:
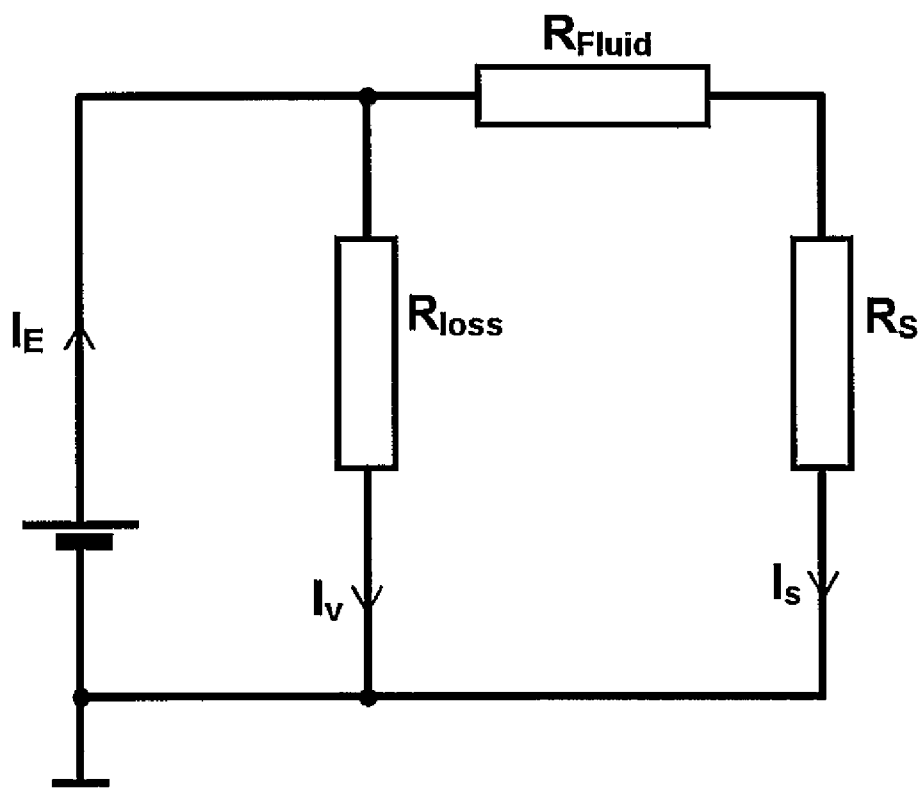
FIG. 2 shows an equivalent circuit diagram of the measuring setup, which slightly simplifies reality. Currents are again drawn in the technical flow direction.
Figure 3:
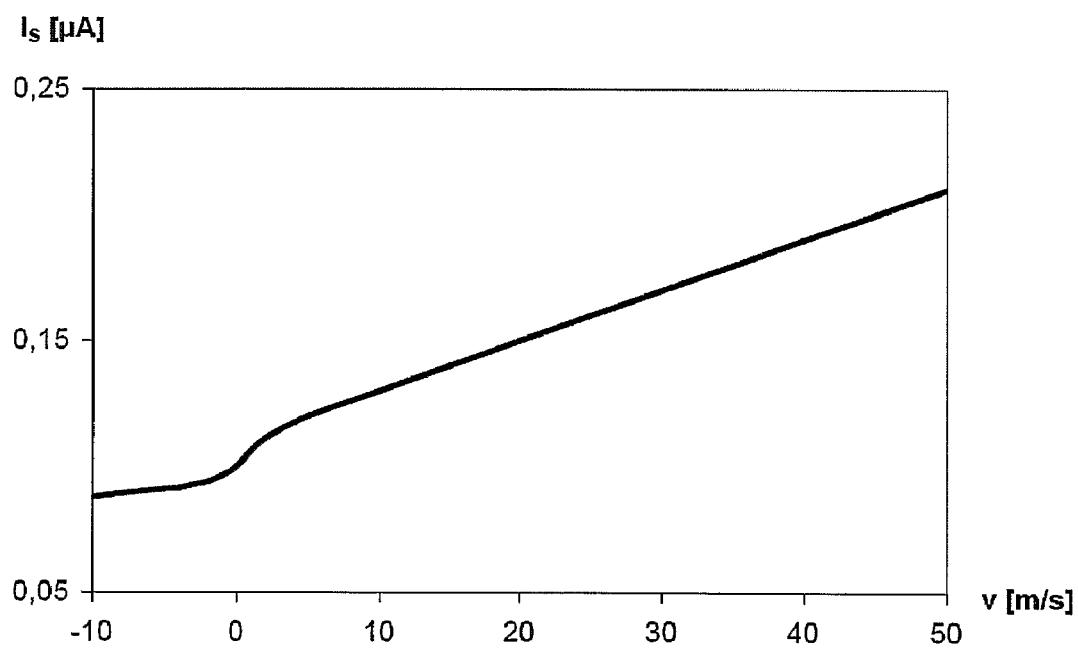
FIG. 3 shows a typical graph of the dependency of the relative size of the sensor current via the velocity of the fluid flow.

If one wants to at least approximately mathematically describe the dependency between the sensor current $I_s$ on the one hand and the velocity of the fluid 1 on the other hand by means of the described measuring configuration, it can also be envisioned as being caused by a circuit configuration according to FIG. 2. It should thereby be assumed that the resistance $R_{Fluid}$ representing the fluid flow through the fluid decreases approximately linearly with the velocity of the fluid.

Current experiments have shown that the arrangements yield usable reproducible results and do not, for example, saturate for smaller negative fluid velocities up to 50 m/sec high positive fluid velocities (positive corresponds to the direction of the arrow in FIG. 1). These experiments have furthermore shown that the arrangement supplies measuring results, which can be used well, even at temperatures of around 450°. Last but not least, it turned out that the arrangement works robustly against contamination and moisture.

Even though the physical processes in reality run in a considerably more complex manner, the measuring arrangement according to the invention appears to operate similarly to a simple ohmic current divider. Together with the improved robustness, the greater temperature range and the fact that an electrode parts do not need to project into the flow or would have to encompass a greater area, an abundance of previously untapped applications become available.

Due to the fact that the sensor electrode is mostly neutral with reference to its electrical effect on the charge carriers in the fluid flow, a plurality of sensor electrodes can be used in a measuring configuration without problems at different edges of the cross sectional area of the fluid flow and, if intended, also in the midst of the cross sectional area, wherein it is indeed possible to provide only a single common emitter electrode for a plurality of sensor electrodes.

Due to the fact that the measuring arrangement comprising flat components on the surface of the fluid flow is sufficient, the electrodes may be manufactured in a cost-efficient manner as conducting parts on insulation films. The assembly by means of adhering the films to the definition of the fluid flow to be measured thus also becomes simple and cheap. The electrodes of the sensor units may also be inserted into the wall of the fluid duct so as to be flush.

Due to the fact that it is possible to supply many emitter electrodes at the same time with a single voltage supply unit, which is relatively expensive, larger measuring arrangements, which use many emitter and sensor electrodes, thus become very cost-efficient.

If precisely a single emitter electrode and a single sensor electrode are arranged on a duct wall, the velocity component of the fluid flow, which is parallel to the connecting line of these two electrodes, can be measured.

Figure 4:
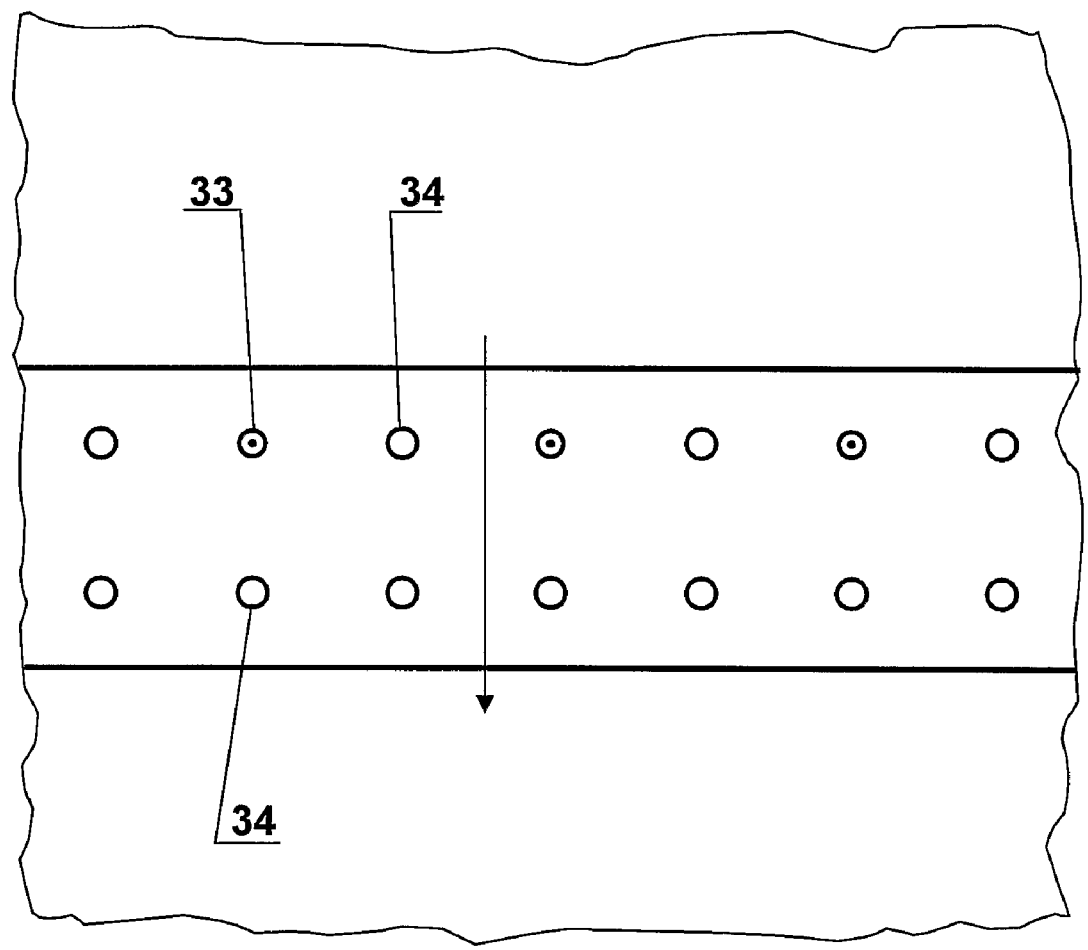
FIG. 4 shows a view from the side of a fluid flow to the duct wall part defining it, which is provided with a configuration consisting of a plurality of electrodes for the measurement according to the an embodiment of system described herein.

If a plurality of sensor electrodes is arranged on the duct wall around an emitter electrode, a conclusion relating to the magnitude and direction of the entire fluid flow can be drawn from the signals measured on the individual sensor electrodes in that a conclusion relating to the individual velocity vectors, that are directed from the emitter electrode to the respective sensor electrode, can be drawn from the individual signals and a conclusion can be drawn therefrom to the total velocity by means of vector computation. With reference thereto, FIG. 4 illustrates in an exemplary manner how a plurality of emitter electrodes 33 and an even larger number of sensor electrodes 34 are arranged on a strip made of an insulating material and how they are fastened on the duct wall.

Figure 5:
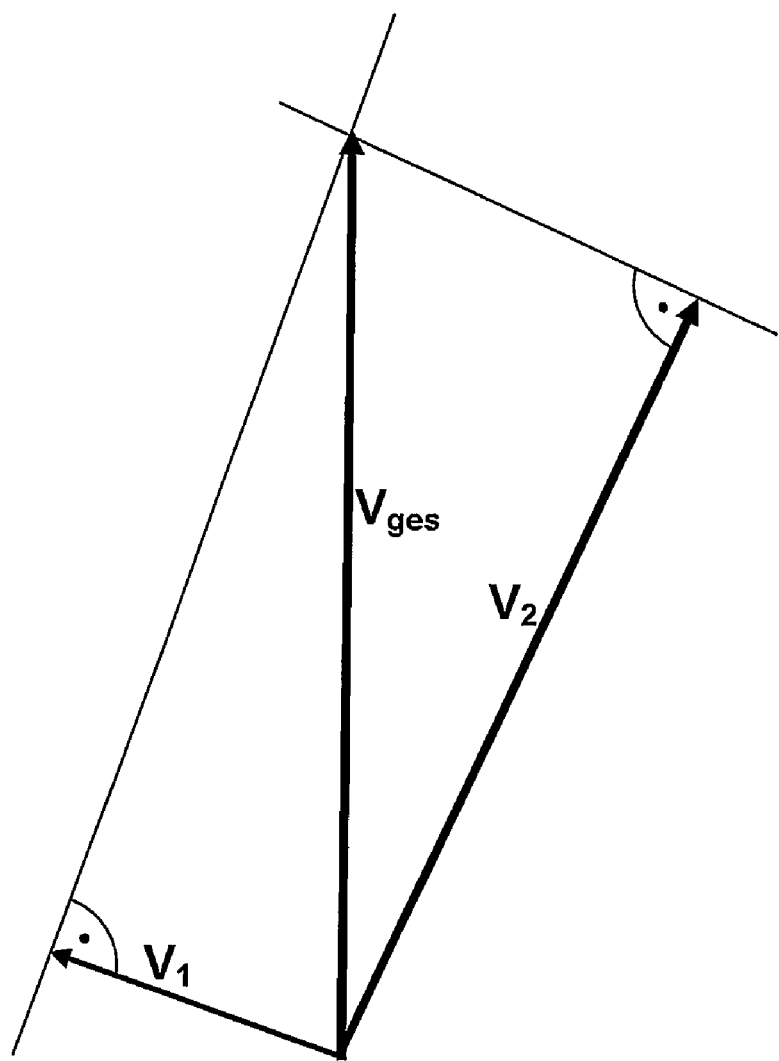
FIG. 5 illustrates an approximated computation for drawing a conclusion relating to the total velocity from the measurement of two velocity components of a fluid flow located in different directions.

It is illustrated in FIG. 5 how the total velocity of a fluid flow in two dimensions, that is, across an area, can be computed in magnitude and direction if at least two individual components of this velocity are measured, which are not parallel to one another. The vector of the total velocity $v_{ges}$ then runs from the assumed common starting point of the two component vectors $v_1$, $v_2$ to the point, where the perpendiculars on these component vectors extending from the end points of the component vectors $v_1$, $v_2$ intersect.

For three dimensions, this means that the vector of the total velocity can be computed graphically from at least three individual components, which are not parallel to one another in that the vector is formed, which reaches from an assumed common starting point of the three component vectors to the point, where all three planes meet, which in each case extend perpendicularly thereto from an end point of a component vector.

In practice, this geometric context will be illustrated in the form of a mathematical formula and this formula will be automatically computed by means of electronic data processing.

Particularly simple circumstances, of course, come about when the two or three measured individual components are perpendicular to one another, i.e. when the connecting lines between one or more emitter electrodes and the individual sensor electrodes in each case pare perpendicular to one another. The total velocity across an area and in a space, respectively, is then simply the vectorial sum of the individual components.

When a measurement is performed with more than two sensor electrodes in planar fluid flows or with more than three sensor electrodes in spatial fluid flows, the system is then over-determined for the computation of the actual flow direction. If this leads to ambiguous results, this can be interpreted and evaluated as evidence of a malfunction of individual sensor electrodes.

Of course a single sensor electrode is sufficient for the one-dimensional determination of direction. This is suitable, in particular, when due to a slim shape of the duct a forward and backward motion, respectively, in a longitudinal direction is the only possible.

Additionally, the computation according to FIG. 5 and the conclusions resulting therefrom apply better, the closer the flow direction of the fluid coincides with the direction of the connecting line between emitter electrode and sensor electrode. Larger deviations come about when these two directions are located normally on one another. According to present considerations, the velocity component measured at this sensor would then always have to be zero, independent on the actual magnitude of the fluid velocity. Actually, however, a sensor signal, which is a function of the size of the fluid velocity, is generated thereby, which markedly decreases with increasing fluid velocity.

A simple possibility to correctly determine the flow direction in two dimensional space is to arrange two or more similar sensor electrodes preferably along an arc of a circle around a common emitter electrode. The sensor electrode, that lies most directly in the direction of the fluid flow from the emitter electrode, provides the strongest signal. In three dimensional space, three or more sensor electrodes would have to be fixed accordingly preferably on the surface of an imaginary spherical shell, in the center of which the emitter electrode is located.

Special flow conditions, such as vibrations and turbulences, may also be detected very well by means of the configuration according to the system described herein.

Vibrations of the fluid flow mean chronologically fast, at least approximately periodic velocity changes at individual locations. They are easily identified by means of the measuring arrangement according to the invention, because said measuring arrangement operates virtually without any delay and thus shows a similarly fluctuating electrical signal on the sensor electrodes in the course of time arranged in the region of vibrations.

A turbulence of the fluid flow means that circulating flows overlap the flow, which is otherwise oriented so as to be substantially downstream, and that the velocities at the individual locations furthermore change rapidly. Turbulences are detected due to "noise", that is, due to rapid disordered chronological fluctuations of the measuring signal. The "cleaner" (=freer from interference) the measuring signal, the lower the degree of turbulence of the fluid. By means of a chronological averaging, for example in the form of a low-pass filtering of the measuring signal, the noise can be suppressed and a conclusion can be drawn relating to the average flow over a period. The averaging over time, however, leads to a slowdown of the measurement. By means of a configuration of a plurality of sensor electrodes, which are spaced apart from one another in and on a cross sectional area and by means of averaging of their measuring results received at the same time, a conclusion relating to the actual total flow through this cross sectional area can be drawn more rapidly. Even under highly turbulent conditions, it thus becomes possible to more rapidly measure a fluid flow through a cross sectional area than would currently be possible by means of other methods.

In an embodiment, an economically beneficial application of the system described herein is the use of the measuring principle according to the system described herein for the cylinder-selective control of the air supplied to a combustion engine. With a multi-cylinder combustion engine, this means that the measuring configuration can also be installed extra into each suction pipe, which leads precisely to a single cylinder. Due to the fact that the measurement supplies correct results even in response to high velocities, in response to rapid velocity changes and even in response to negative velocities, the supplied amount of air can be detected accurately. Parameters, such as fuel quantity to be injected, injection time and ignition time can thus be correctly set for each cycle of the engine and individually for each cylinder, which makes it possible to better maintain the engine in an optimal operating state. It is advisable not only for this application to use the high voltage source 5, which is the most cost-intensive component of the measuring configuration, for a plurality of measuring arrangements, which can include climate control and climate regulation, respectively.

In this application, it is an advantage of the measuring device according to the system described herein that turbulences generated in the swirl and inlet ducts can be detected well and the effects thereof on the total flow can be faded out by means of sum or difference measuring, if necessary. This characteristic can be very valuable when charging the cylinders of a combustion engine with air, which may be vortexed in a certain manner for the purpose of an optimal filling.

A related economically beneficial application is the measurement of the exhaust gas flow admixed to the intake air in combustion engines comprising an exhaust gas feedback. Due to the pressure, temperature and velocity fluctuations occurring thereby, a conclusion relating to the quantity of the fed-back exhaust gas can currently be made only very indirectly, inaccurately and chronologically averaged. This can be improved considerably by means of the measuring device according to the system described herein. It is sufficiently robust so as not to be destroyed even in response to being arranged in the feedback duct and it is so rapid that it is not only possible to detect average values but also the chronological course of actual values of the flow velocity. In combination with temperature measurements, the actual chronological course of the mass flow can thus be detected very well.

As already indicated further above, the measuring method according to the system described herein can also be used when the fluid to be measured does not flow into a duct comprising a closed cross sectional definition. For example, the local flow at the surface of the exterior shell of an airplane can be measured while the airplane flies. In so doing, a local turbulence can be identified by means of the noise that may occur in the measuring signal or a conclusion can be drawn relating to the actual relative velocity of the airplane in terms of to magnitude as well direction as compared to the ambient air. By means of flow velocity measurement on the upper side and on the lower side of an airplane wing the buoyancy affecting the corresponding surface area may be computed. Due to the more accurate knowledge relating to flow states at the airplane, which can be detected therewith, it is possible to either entirely avoid critical flow states or to at least identify them faster; the control can take place faster and critical states can be approached closer due to the improved detection of the true state.

It goes without saying that the considerations made for an airplane can also be generalized for all aerodynamically circulated surfaces.

If the wall of the fluid duct is made of an electrically insulating material, it goes without saying that it cannot form the counter electrode to the emitting electrode. A separate counter electrode, which is preferably grounded or is connected to ground reference, may then be fixed at the margin of the fluid duct. Surprisingly, however, it has turned out that even with a duct wall consisting of electrically insulating material it is not absolutely necessary to fix a counter electrode directly in or on the cross section of the fluid duct. The counter electrode can also be formed by a ground connection fixed outside of the fluid duct. To avoid uncontrollable electrostatic charges and to attain a more or less well defined electrostatic state, attempts should nonetheless be made to accommodate the counter electrode within a close range of the definition of the fluid duct, at least in a defined manner.

Figure 6:
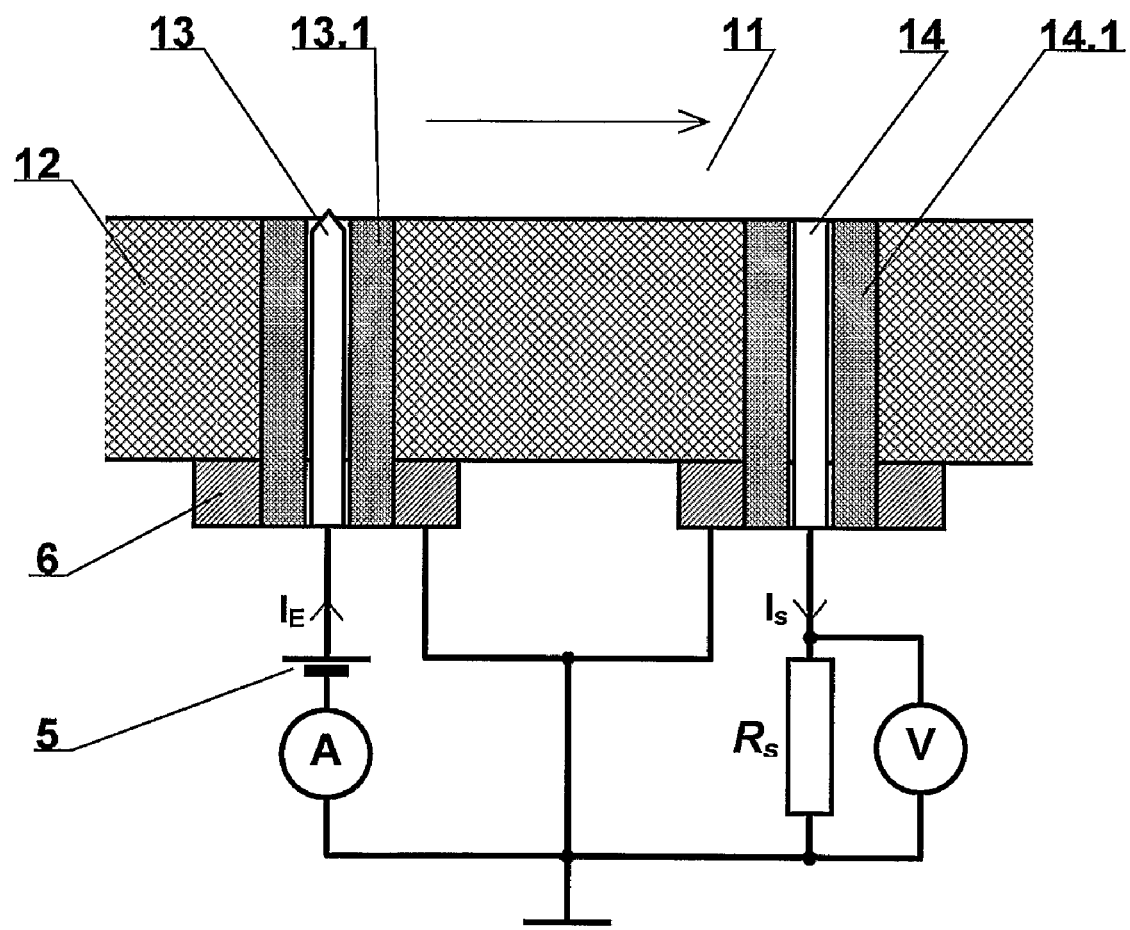
FIG. 6 shows a measuring setup in a side view on a fluid flow defined by a duct wall consisting of electrically insulated material. In the electric circuit outlined therein, the measurement of the sensor current Is is realized by measuring the voltage drop at a measuring resistance RS.

FIG. 6 shows how the counter electrode 6 is formed by means of electrically conductive rings around the insulations 13.1 and 14.1 around the emitter electrode 13 and the sensor electrode 14, which are arranged on the exterior of an electrically insulating duct wall 12. The emitter electrode 13 and the sensor electrode 14 penetrate the electrically insulating duct wall 12 at different locations, which are spaced apart from one another for the purpose of measuring a fluid flow 11.

Figure 7:
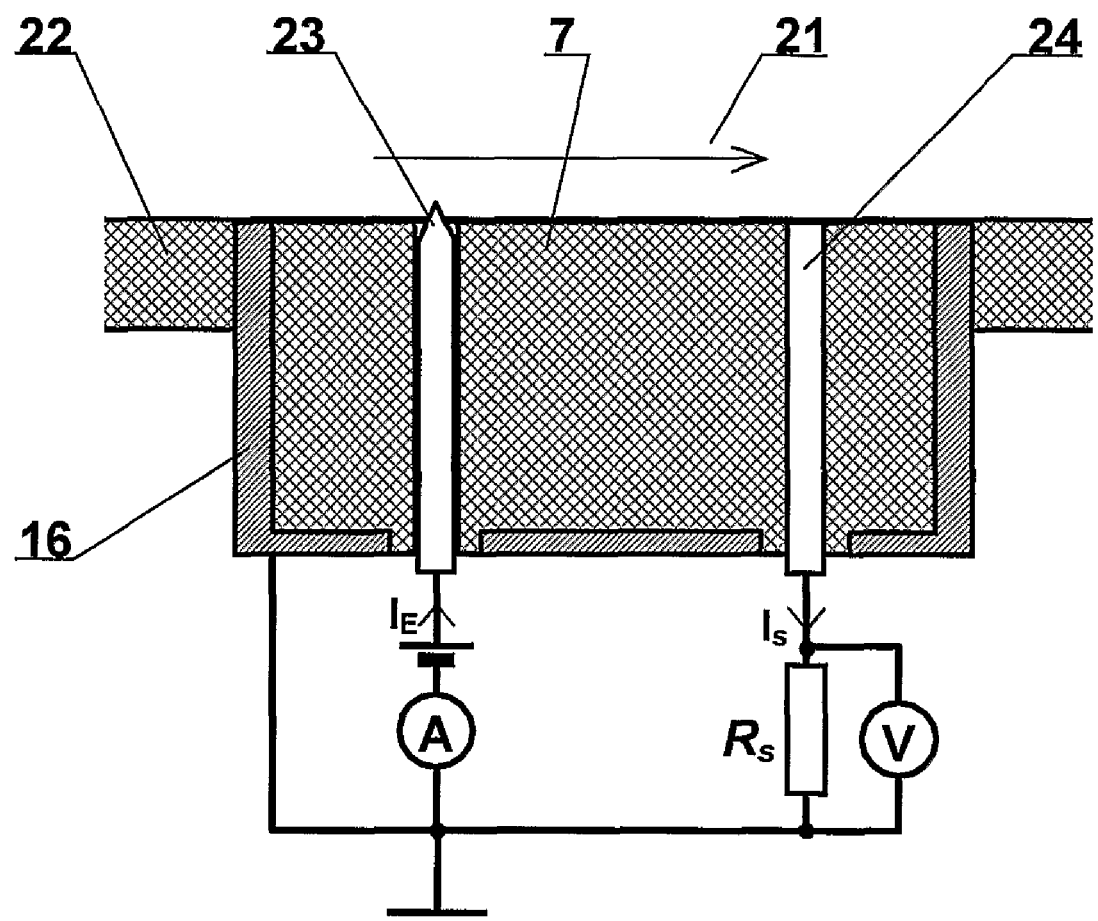
FIG. 7 shows a unit in a side view consisting of a plurality of electrodes and insulation, which is installed into an opening in a duct wall defining a fluid flow for the purpose of measuring according to an embodiment of the system described herein.

FIG. 7 shows an assembly, which is formed by a counter electrode 16, which is embodied as a housing being open on one side and which is naturally electrically conducting and into which an insulation 7 is inserted, into which a sensor electrode 24 and an emitter electrode 23, which are arranged so as to be insulated from one another and from the counter electrode, are in turn inserted. This assembly is inserted into an opening of a duct wall 22 so as to measure a fluid flow 21. An assembly of this type can be used for many different cases of operation. It is not important thereby whether or not the duct wall 22 is electrically conducting.

In the practical use, the sensor arrangement will be combined with a data processing device, into which the current and voltage measurement results, respectively, and information relating to pressure and temperature of the fluid to be measured as well as possible further information, which is helpful for the subsequent calibration, are read in. The following is to be stored in the data processing device:

- a measuring curve, i.e. which sensor current $I_s$ means which velocity, recorded in response to a calibration run at a defined temperature and at a defined pressure;
- a rule recorded in response to one or more calibration runs, according to which the calibrated current-velocity curve can be adapted to the actually prevailing temperature and pressure conditions by means of displacement and scaling, if applicable;
- optional information relating to further measuring variables, which show under which conditions occurring during operation, the fluid to be measured has a certain known velocity so that the device can be continuously recalibrated;
- optional rules according to which a new calibration at individual sensor electrodes is carried out corresponding to the change of the measuring data at individual sensor electrodes, provided that they conflict with the measuring data at the other sensor electrodes;
- consideration of the emitter current so as to draw a conclusion therefrom relating to changes in the composition of the fluid or the environment. Such changes can relate to gas compositions, moisture, particle content, content of free radicals, short-circuit or deposits, for example.

The data processing device can then be programmed to render the following outputs:

- information relating to the actual velocity of the; considered fluid at individual sensor electrodes;
- information relating to averaged velocities;
- information relating to mass flow of the fluid (g/sec);
- information relating to cumulated mass of the flown fluid;
- readjusting the calibration according to pressure/temperature or by means of deviations determined via reference points (e.g. due to contamination);
- triggering switching operations, such as, for example, short-term increase of the voltage of the emitter electrode, possibly in response to simultaneously turning off the sensor electrode so as to burn off contaminations on the emitter electrode;
- information relating to the presence and intensity of vibrations;
- information relating to the presence and intensity of turbulences;
- identification of the angle of yaw, e.g., in aircrafts;
- identification of the angle of approach, e.g., in aircrafts;
- identification of the relative velocity, e.g., in aircrafts;
- identification of forward or backward flow;
- identification of the one-dimensional fluid direction;
- identification of the two-dimensional fluid direction;
- identification of the three-dimensional fluid direction;
- optional information relating to sum impact parameters (e.g. pressure & temperature);
- etc.

It has been determined as rules of thumb for the dimensioning:

- the area of a flush sensor electrode 4 should be at least 0.5 in mm$^2$ and the maximum fluid velocity to be measured should maximally be 2.5 in m/s;
- the sensor area of a projecting sensor electrode 4 in mm$^2$ should be between 1 and the numerical value of the fluid velocity to be measured maximally in m/s;
- the current through the emitter electrode (3) should be in the range from one to hundred uA;
- the optimal distance between emitter electrodes and sensor electrodes is a function of the introduced high voltage and of the fluid velocity to be measured; typically, it lies in the range of approx. 8 to approx. 100 mm;
- the measuring resistance $R_S$ at the sensor is typically 3 to 30 megaohm.

Mainly if the high voltage-guiding emitting electrode 3 is flush with the enclosing counter electrode, it may be advantageous not to directly connect this counter electrode with ground, but via an electric resistance. This resistor should be smaller than the measuring resistance $R_S$ at the sensor electrode. By means of this resistor, the draining current can be measured well and it could be determined therewith whether—principally undesired—creeping currents are at hand from the emitting electrode 3. An icing of the emitter electrode can be identified therewith, for example. In response to a possible flashover, the current is limited by such a resistance. The resistance should be smaller than the measuring resistance $R_S$, because it thus takes over a greater portion of the power supply in case of a sparkover and thus protects the measuring device.

It is not necessarily required to operate the emitter with a DC voltage and a DC current, respectively. Tests have shown that an operation with alternating voltage and alternating current, respectively, is also possible.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method for measuring flow velocity of a fluid flow, comprising:
  emitting electric charge carriers into the fluid flow from an emitter electrode, wherein the emitter electrode is under high voltage and touches the fluid flow at a first position, and wherein an emitter current flows through the emitter electrode;
  receiving a first portion of the emitted charge carriers by a sensor electrode which touches the fluid flow at a second position, wherein a sensor current flows through the sensor electrode, and wherein a second portion of the emitted charge carriers drains off via a counter electrode which is insulated from the emitter electrode;
  measuring the sensor current and the emitter current to provide a measured value of the sensor current and a measured value of the emitter current; and
  computing the flow velocity of the fluid flow from the ratio between the measured value of the sensor current and the measured value of the emitter current, the flow velocity of the fluid flow being computed according to a proportional relationship to the ratio between the measured value of the sensor current and the measured value of the emitter current.

2. The method according to claim 1, wherein a projected surface of the sensor electrode projected on a cross sectional area of the fluid flow is small compared to the cross sectional area of the fluid flow at the second position.

3. The method according to claim 1, wherein the first portion of the emitted charge carriers is continuously received by the sensor electrode.

4. The method according to claim 1, wherein the fluid flows in a flow duct and a duct wall of the flow duct is used as counter electrode.

5. The method according to claim 1, wherein a plurality of sensor electrodes are arranged at different positions of the fluid flow.

6. The method according to claim 4, further comprising:
  measuring at least one of: pressure, temperature and moisture of the fluid flow;
  computing from the flow velocity the mass quantity flowing through the cross sectional area of the fluid flow per time unit.

7. The method according to claim 5, further comprising:
  performing a calibration, the calibration including:
    measuring sensor currents at different known flow velocities to attain a calibrated measuring curve; and
    using the measuring curve in the subsequent step of computing the flow velocity.

8. The method according to claim 5, further comprising:
  performing a calibration, the calibration including:
    measuring the sensor currents of at least two sensor electrodes comprising characteristic curves which are known from the considered fluid and which are different with reference to the flow velocity; and
    determining characteristic curve points in the different characteristic curves of the at least two sensor electrodes in which the measured flow velocities and further parameters of the fluid correspond to one another.

9. The method according to claim 5, further comprising:
  measuring the sensor currents at the sensor electrodes;
  computing vectorial flow velocity components from the corresponding sensor currents, the velocity components occurring at the respective positions of the sensor electrodes from the direction of the corresponding emitter electrode; and
  computing magnitude and direction of the flow velocity vector from the flow velocity components.

10. The method according to claim 1, wherein the emitter current through the emitter electrode is in the range from one to hundred microamperes.

11. The method according to claim 1, wherein chronological vibrations of the sensor currents are evaluated for determining vibrations in the flow velocity.

12. The method according to claim 1, wherein the noise portion of the measured sensor currents is evaluated to identify turbulences in the flow.

13. An apparatus for measuring flow velocity of a fluid flow, comprising:
  a high voltage source;
  an emitter electrode connected to the high voltage source, wherein the emitter electrode is tangentially arranged at the fluid flow, and wherein electric charge carriers are emitted into the fluid flow and an emitter current flows through the emitter electrode;
  a sensor electrode disposed at a second location of the fluid flow, wherein a first portion of the emitted charge carriers is drained by the sensor electrode and a sensor current flows through the sensor electrode;
  a counter electrode that is insulated from the emitter electrode, wherein a second portion of the emitted charge carriers flows off via the counter electrode;
  a measuring device that measures the sensor current and the emitter current, wherein the measuring device provides a measured value of the sensor current and a measured value of the emitter current; and
  a computing device that computes the flow velocity of the fluid flow, wherein the computing device computes the flow velocity from the ratio between the measured value of the sensor current and the measured value of the emitter current, the flow velocity of the fluid flow being computed according to a proportional relationship to the ratio between the measured value of the sensor current and the measured value of the emitter current.

14. The apparatus according to claim 13, wherein a projection area of the sensor electrode projected to a cross sectional area of the fluid flow is small as compared to the cross sectional area of the fluid flow at the second location.

15. The apparatus according to claim 13, wherein the first portion of the emitted charge carriers is drained by the sensor electrode in a chronologically-continuous manner.

16. The apparatus according to claim 13, wherein the fluid flow flows in a flow duct and a duct wall of the flow duct is the counter electrode.

17. The apparatus according to claim 13, wherein a plurality of sensor electrodes are arranged at different locations of the fluid flow.

18. The apparatus according to claim 13, further comprising:
  an electrically insulating support film on which at least one emitter electrode and at least one sensor electrode are arranged.

19. The apparatus according to claim 18, wherein the support film is adhered to a duct wall defining the fluid flow.

20. The apparatus according to claim 19, wherein the duct wall defining the fluid flow is the exterior shell of an aircraft or the inner wall of a closed tubular flow duct.

21. The apparatus according to claim 13, wherein the sensor and the emitter electrodes disposed in a duct wall defining the fluid flow in a flush manner.

22. The apparatus according to claim 13, wherein the apparatus is arranged in an exhaust gas duct of a combustion chamber of a combustion engine to measure the flow velocity of the gases returned through the exhaust gas duct of the combustion chamber.

* * * * *

Disclaimer

7,854,175 B2— Guenter Weilguny, Altheim (AT); Wasner Wolfgang, Ried im Innkreis (AT); Michael Naderhirn, Linz (AT). APPARATUS FOR MEASURING THE VELOCITY OF A FLUID FLOW. Patent dated December 21, 2010. Disclaimer filed December 19, 2012, by the assignee, Gunytronic Gas Flow Sensoric Systems GmbH.

Hereby disclaim all claims 1-22 of the patent (*Official Gazette, February 26, 2013*)